United States Patent Office 3,415,736
Patented Dec. 10, 1968

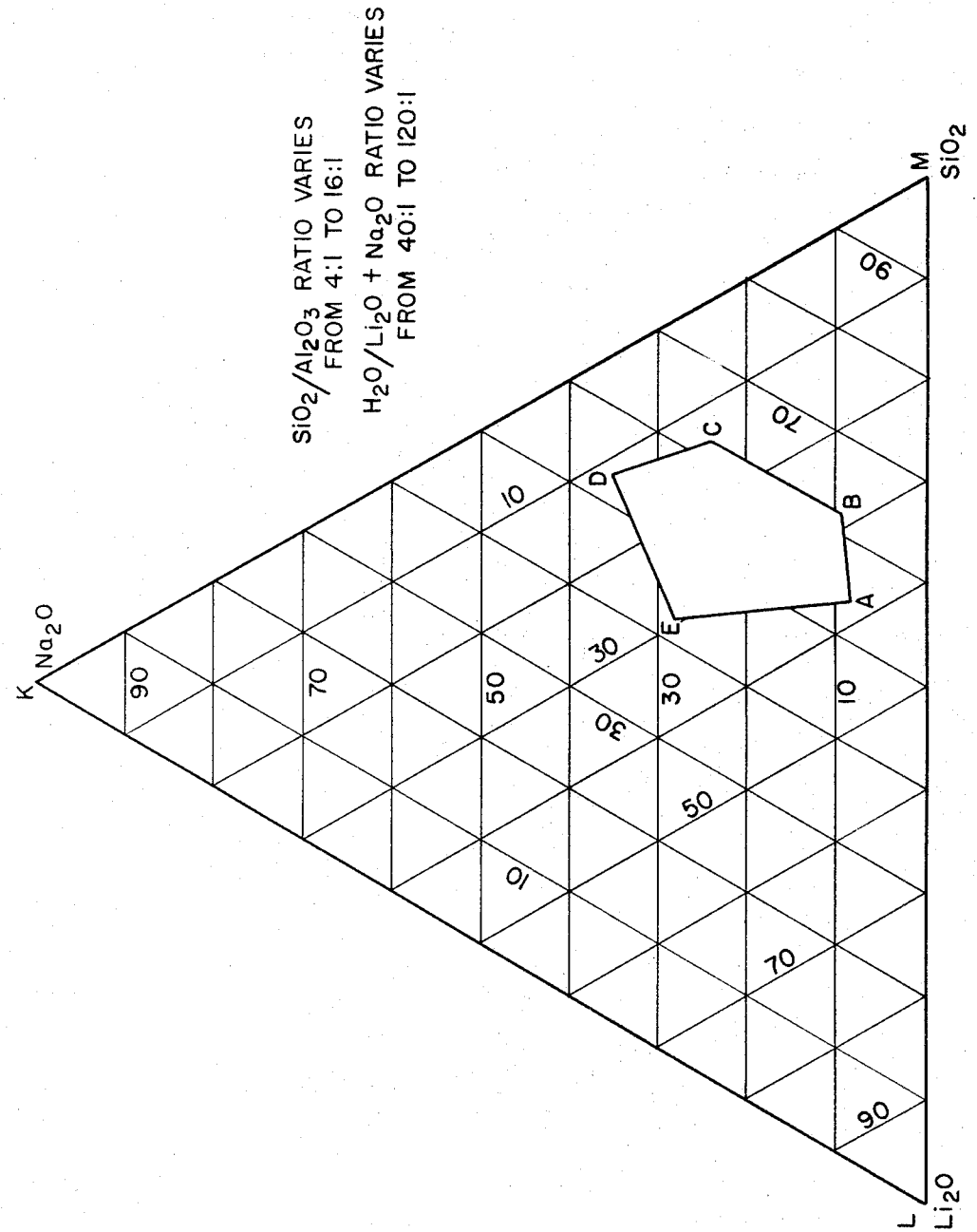

3,415,736
LITHIUM-CONTAINING CRYSTALLINE
ALUMINOSILICATE
Julius Ciric, Pitman, N.J., assignor to Mobil Oil
Corporation, a corporation of New York
Filed Sept. 20, 1965, Ser. No. 488,443
16 Claims. (Cl. 208—111)

ABSTRACT OF THE DISCLOSURE

A new zeolite composition having a characteristic X-ray diffraction pattern and having a composition, in terms of mole ratios of oxides:
$0.05-0.8Li_2O:0.95-0.2Na_2O:Al_2O_3:2.0-6SiO_2:0-9H_2O$
a process for making the same and a process for utilizing a catalyst comprising the same for hydrocarbon conversion.

This invention relates to a novel class of crystalline aluminosilicates and to methods for preparing the same. More specifically, it relates to new crystalline lithium-sodium aluminosilicates and their preparation.

Both natural and synthetic crystalline aluminosilicates are known and may generally be described as aluminosilicates of ordered internal structure having the following general formula:

$$\frac{M_2}{n}O:Al_2O_3:YSiO_2:ZH_2O \quad (I)$$

where M is a cation, n is its valence, Y the moles of silica, and Z the moles of the water of hydration.

When water of hydration is removed from the crystalline aluminosilicates, highly porous crystalline bodies are formed which contain extremely large adsorption areas inside each crystal. Cavities in the crystal structure lead to internal pores and form an interconnecting network of passages. The size of the pores is substantially constant, and this property has led to the use of crystalline aluminosilicates for the separation of materials according to molecular size or shape. For this reason, the crystalline aluminosilicates have sometimes been referred to as molecular sieves. They are also zeolitic.

The crystalline structure of such molecular sieves consists basically of three-dimensional frameworks of $SiO_4$ and $AlO_4$ tetrahedra. The tetrahedra are cross-linked by the sharing of oxygen atoms, and the electrovalence of the tetrahedra containing aluminum is balanced by the inclusion in the crystal of a cation (M in Formula I), e.g., alkali metal or alkaline earth metal ions or other cationic metals and various combinations thereof. These cations are generally readily replaced by conventional ion-exchange techniques.

The spaces in the crystals between the tetrahedra ordinarily are occupied by water. When the crystals are treated to remove the water, the spaces remaining are available for adsorption of other molecules of a size and shape which permits their entry into the pores of the structure.

Molecular sieves have found application in a variety of processes which include ion exchange, selective adsorption and separation of compounds having different molecular dimensions such as hydrocarbon isomers, and the catalytic conversion of organic materials, especially catalytic cracking processes.

According to the invention, the composition of the new aluminosilicate, in terms of mole ratios of oxides, may be set forth as follows:

$0.05-0.8Li_2O:0.95-0.2Na_2O:Al_2O_3$:
$2.8-4.5SiO_2:0-9H_2O \quad (II)$

It is contemplated that the silica may exceed 4.5 moles, going up to 5.5 to 6 moles, and also that it may be as low as 2.0 moles. Preferably the composition is defined as follows:

$0.3-0.8Li_2O:0.7-0.2Na_2O:Al_2O_3$:
$2.8-4SiO_2:0-9H_2O \quad (III)$

For convenience, the new material, which may comprise a number of species as is evident from Formula (II), may be referred to as Zeolite ZSM-3, or simply as ZSM-3. Zeolite ZSM-3 may be identified and distinguished by X-ray diffraction analysis as well as by composition. Following are data of an X-ray powder diffraction pattern of a typical example of ZSM-3, it being understood that all species thereof exhibit essentially the same pattern.

TABLE 1

| Line No.: | Interplanar Spacing, dA° | Relative Intensity | Comment |
|---|---|---|---|
| 1 | 15.50 | m | |
| 2 | 14.37 | s | |
| 3 | 13.39 | vvw | |
| 4 | 8.89 | m | |
| 5 | 7.53 | m | |
| 6 | 7.38 | m | Very broad. |
| 7 | 5.77 | m | Broad. |
| 8 | 5.07 | w | |
| 9 | 4.81 | w | |
| 10 | 4.42 | m | |
| 11 | 4.21 | w | Do. |
| 12 | 4.15 | w | Do. |
| 13 | 3.82 | w | Very broad. |
| 14 | 3.75 | w | Broad. |
| 15 | 3.47 | w | Do. |
| 16 | 3.34 | m | |
| 17 | 3.23 | w | Do. |
| 18 | 3.20 | w | Do. |
| 19 | 3.05 | m | |
| 20 | 2.94 | w | |

NOTE.—w=weak; s=strong; m=medium; vvw=very, very weak.

Standard techniques were employed to obtain the foregoing data. The radiation was the K alpha C doublet of copper, and a Geiger counter spectrometer with a strip chart pen recorder was used. The peak heights, I and the positions as a function of 2 times theta, where theta is the Bragg angle, were read from the spectrometer chart. From these, the relative intensities, $100 \, I/I_0$ where $I_0$ is the intensity of the strongest line or peak, and $d$ (obs.), the interplanar spacing in A., corresponding to the recorded lines, were calculated. In Table 1 the relative intensities are given in terms of the symbols $w$=weak, $s$=strong, $m$=medium, and $vvw$=very, very weak.

Zeolite ZSM-3 is a large pore zeolite of the faujasite type, by which is meant that it exhibits an X-ray diffraction pattern similar to that of faujasite, although there are significant differences. The pores are large enough to sorb cyclohexane. Thus, a specific ZSM-3 zeolite (completely dehydrated) of the formula:

$$0.4Na_2O:0.6Li_2O:Al_2O_3:3.1SiO_2 \quad (IV)$$

was observed to adsorb 16.1 g. cyclohexane per 100 g. of zeolite; it also adsorbed 25.2 g. water per 100 g. of zeolite. Crystals of ZSM-3 have a hexagonal shape, as determined by electron miscroscopy. The lithium in ZSM-3 is zeolitic and completely exchangeable; its amount exceeds 0.05, preferably 0.3 equivalent of lithium per gram atom of aluminum, i.e., the aluminum that is present in the framework structure of the aluminosilicate.

Zeolite ZSM-3 is capable of being ion exchanged to partially or completely replace the sodium cation by other cations. During this step, part or all of the lithium cation is also replaced by the replacing cation. It will be understood that the spatial arrangement of the aluminum, silicon, and oxygen atoms, which form the basic crystal lattice of ZSM-3, remains essentially unchanged by the described replacement of sodium and lithium, and that the X-ray powder diffraction pattern of the ion-exchanged material is essentially the same as that set forth in Table 1. The replacing cations include monovalent, divalent, trivalent, quadrivalent cations, and they may be selected from ions of the following: metals of Group IA of the Periodic Table, such as potassium; metals of Group IB, such as silver; metals of Group IIA, such as magnesium, calcium and strontium; metals of the transition metals, such as those of atomic numbers 21–28, 39–46, and 72–78, inclusive; metals of the actinide series; and rare earth metals such as cerium, lanthanum, praseodymium, neodymium, samarium and mixtures thereof with each other and the other rare earths. Other useful replacing cations are ammonium, alkylammonium, and arylammonium cations, these leading to a product which, on calcining, decomposes to the hydrogen form. Ion exchange of the zeolite may be accomplished conventionally, as by packing the zeolite in the form of beds in a series of vertical columns and successively passing through the beds a water solution of a soluble salt of the cation to be introduced into the zeolite; and then to change the flow from the first bed to a succeeding one as the zeolite in the first bed becomes ion exchanged to the desired extent.

It will be seen from the preceding paragraph that zeolite ZSM-3 may be more broadly defined, in terms of oxides, as follows:

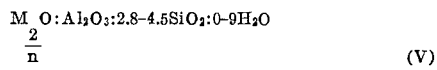

$$M_{\frac{2}{n}}O : Al_2O_3 : 2.8\text{-}4.5 SiO_2 : 0\text{-}9H_2O \qquad (V)$$

where M represents at least one cation having a valence of not more than 3 or 4, and $n$ represents the valence of M. As noted, the silica may be as high as 5.5 to 6 moles and as low as 2.0 moles. If the replacing cation described in the preceding paragraph replaces only part of the sodium and lithium, it will be seen that M may represent three different cations; and if the replacing cation replaces all of the sodium and lithium, then M represents one cation. Also, if a mixture of cations is used to replace sodium and lithium, then M can represent more than three cations depending on the number of cations in the mixture. As indicated, M is at least one cation chosen from metals of Groups I and II of the Periodic Table, rare earth metals, transition metals, metals of the actinide series, and ammonium, alkylammonium, and arylammonium cations. The essential limitation of the zeolites defined by Formula (V) is that they exhibit essentially the same X-ray powder diffraction pattern as Table 1.

ZSM-3 is of use as a catalyst in the catalytic cracking of hydrocarbons. Owing to its large pores, it can admit branched chain and cyclic hydrocarbons as well as straight chain hydrocarbons. In a useful procedure for this purpose, the zeolite is subdivided, mixed with a porous inorganic matrix to form a mass, dried, and heated to 500–1500° F. for one hour, preferably 1 to 48 hours. Suitable procedures for distributing or suspending the zeolite in the matrix, and also suitable matrix materials, are described in U.S. Patents 3,140,249, 3,140,251, and 3,140,253. The mass is then steamed as this tends to increase the selectivity of the catalyst. Steaming may be done at 1000–1300° F. for 2 to 100 hours in an atmosphere containing at least about 10% by volume of steam, and usually containing air or other inert gas. The catalytic effect of a ZSM-3 containing catalyst is illustrated in Examples 4 and 5. The zeolite is also of use in other hydrocarbon conversion reactions such as hydrocracking, where it may be used either in the assynthesized form or, preferably, having impregnated therein or thereon a hydrogenating component like tungsten, vanadium, molybdenum, rhenium, nickel, cobalt, chromium, manganese, and platinum metals, and also compounds of said metals. The last five components in particular may also be ion-exchanged into the zeolite. It is of further use in reactions like hydroisomerization, particularly in association with one of the above components, preferably a platinum metal.

The zeolite may also be employed as an adsorbent, after at least partial dehydration, a step which may be carried out by heating the zeolite to 200–600° C. in an inert atmosphere, such as air or nitrogen, under atmospheric or reduced pressure, or by maintaining the zeolite under vacuum at room temperature or above for a suitable time. As an example, zeolite ZSM-3 may serve to adsorb and remove water from natural gas.

Zeolite ZSM-3 may be suitably prepared by forming a reaction mixture containing lithium oxide, sodium oxide, alumina, silica, and water and having a composition, in terms of mole ratios of oxides, falling within the following ranges:

TABLE 2

|  | Preferred | Broad |
|---|---|---|
| $Li_2O/Li_2O+Na_2O$ | 0.25:1 to 0.82:1 | 0.2:1 to 0.9:1 |
| $Li_2O+Na_2O/SiO_2$ | 0.61:1 to 1.33:1 | 0.55:1 to 2.5:1 |
| $SiO_2/Al_2O_3$ | 4:1 to 16:1 | 2:1 to 32:1 |
| $H_2O/Li_2O+Na_2O$ | 40:1 to 120:1 | 20:1 to 300:1 |

Satisfactory crystallization can be carried out by maintaining the mixture at temperatures of about 20 to 120° C., the pressure being atmospheric or at least that corresponding to the vapor pressure of water in equilibrium with the mixture of reactants. The reaction period may extend from several hours to several days. At lower temperatures in the foregoing range, and at lower alkali to silica ratios, the reaction period tends to be longer. In any event, the mixture is kept at the selected temperature until the desired crystalline zeolite product is formed. The zeolite crystals are then separated from the mother liquor and washed, preferably with distilled water, until the effluent wash water in equilibrium with the product has a pH of preferably below 11. It is of course advantageous to employ soluble initial reactant materials, such as aqueous solutions of sodium aluminate, aluminum chloride, sodium silicate, sodium hydroxide, lithium chloride, lithium hydroxide, etc. Also useful are silica hydrosol, silica gel, and silicic acid. The reaction mixture can be, and preferably is, prepared continuously.

Referring to the foregoing method, the preferred composition of the reaction mixture may be defined more or less graphically in terms of the composition diagram illustrated in the accompanying drawing. This comprises a ternary plot of the system $Na_2O$—$Li_2O$—$SiO_2$, in terms of mole percent, and is to be interpreted in conjunction with the notation appearing thereon to the effect that the silica:alumina ratio of the mixture varies from 4:1 to 16:1 and the water:alkali ratio varies from 40:1 to 120:1. As will be recognized, in this system the line KL represents 0 mole percent silica and the point M represents 100 mole percent silica; the line LM represents 0 mole percent sodium oxide and the point K represents 100 mole percent sodium oxide; and line KM represents 0 mole percent lithium oxide and the point L represents 100 mole percent lithium oxide. The lines parallel to KL and extending toward point M represent increasing concentrations of silica, the first of such lines denoting 10 mole percent, the second 20 mole percent, and so on. The lines parallel to LM and KM have a similar meaning in relation to sodium oxide and lithium oxide, respectively. Attention is now called to the area ABCDEA. Mixtures having a composition falling within this area and characterized by having a $SiO_2/Al_2O_3$ ratio of 4:1 to 16:1 and a

$$H_2O/Li_2O+Na_2O$$

ratio of 40:1 to 120:1 comprise the preferred reaction mixtures which lead to the formation of Zeolite ZSM-3.

A preferred method of preparing the new zeolite comprises making use of a solution or mixture, for convenience deisgnated crystallization directing agent, or CDA, which contains sodium oxide, alumina, silica, and water. It is found that use of this mixture leads to better yields and appears to provide silica and alumina in desirably reactive form. As will appear, the CDA may be in the form of a clear solution, or a slurry or a filter cake. Three alternative methods may be described respecting the use of the CDA and the addition of the lithium oxide-containing source compound to it. According to the first alternative, the CDA is in the form of a clear solution, and the first addition to it comprises a solution containing the lithium compound. According to the second alternative, additions are made to the CDA so that a slurry forms which is filtered, and the lithium compound is added to the filter cake. According to the third alternative, a non-lithium containing filter cake is formed which contains the CDA, and this cake is divided into two parts, to one of which the lithium compound is added, after which the two parts are mixed and heated in the presence of a solution containing lithium oxide and water to effect crystallization of the zeolite.

Considering the first alternative in more detail, a solution of the CDA is formed containing sodium oxide, alumina, silica, and water and having a composition, in terms of mole ratios of oxides, within the following ranges:

TABLE 3

|  | Preferred | Broad |
| --- | --- | --- |
| $Na_2O/SiO_2$ | 1.85:1 | 1.5:1 to 2.2:1. |
| $SiO_2/Al_2O_3$ | 16:1 | 12:1 to 22:1. |
| $H_2O/Na_2O$ | 18:1 | 15:1 to 25:1. |

The ingredients of the CDA mixture are heated to a temperature in the range of 40–70° C., preferably about 60° C., for a time ranging from 15 minutes to 72 hours, preferably 0.5 hour. At lower ratios of sodium oxide to silica, longer times and higher temperatures are preferred. Then a solution containing lithium oxide and water is mixed with one containing sodium oxide, silica, and water, and the resulting mixture is added to the CDA mixture. There is then added a solution containing sodium oxide, alumina, and water to form a reaction mixture having a composition falling within the ranges set forth above in Table 2. The resulting reaction mixture is maintained at a temperature of 20 to 120° C. for a time sufficient to form crystals of Zeolite ZSM-3, and the crystals are separated, washed as described, and recovered. The method is illustrated in Example 1.

According to the second alternative, a CDA solution is formed as described in the first alternative. To this solution there is added a solution containing sodium oxide, silica, and water, and then there is added a solution containing alumina and water to form a slurry. The latter, after treatment as by heating and stirring to make filtration more rapid, is filtered, and there is then added to the filter cake a solution containing lithium oxide and water, thereby forming a reaction mixture having a composition as set forth in Table 4, below.

TABLE 4

|  | Preferred | Broad |
| --- | --- | --- |
| $Li_2O/Li_2O+Na_2O$ | 0.2:1 to 0.8:1 | 0.1:1 to 0.8:1. |
| $Li_2O+Na_2O/SiO_2$ | 0.3:1 to 1.5:1 | 0.25:1 to 3:1. |
| $SiO_2/Al_2O_3$ | 3:1 to 6:1 | 2:1 to 10:1. |
| $H_2O/Li_2O+Na_2O$ | 40:1 to 150:1 | 20:1 to 300:1. |

This reaction mixture is heated as described to form a crystalline slurry which is then filtered, the crystalline product washed as described, and the product recovered. The method is illustrated in Example 2.

The third alternative method for preparing ZSM-3 involves mixing two filter cakes. In general, a first solution is prepared containing sodium oxide, silica, and water, and this is mixed with a CDA solution as described in Table 3. To the resulting mixture there is added a second solution comprising an acidic solution containing alumina and water, giving a mixture having suspended therein a gelatinous precipitate. The precipitate is then filtered off, washed, and the cake recovered. The wet amorphous cake is then divided into two parts identified as cake I and cake II. Cake I is placed to one side, while cake II is treated with a solution containing a lithium salt, such as lithium chloride, and water to introduce lithium into the material by ion exchange, after which it is washed. The two wet cakes are then mixed, a solution containing lithium oxide and water is added, and after a suitable time crystalline ZSM-3 is formed and may be recovered. This method is of interest because it enables lower ratios of alkali (lithium oxide plus sodium oxide) to silica to be used in the preparation of the zeolite.

The invention may be illustrated by the following examples.

Example 1

Zeolite ZSM-3 was synthesized in the following way. Four solutions were prepared, identified as A, B, C, and D:

| Solution A, or CDA solution: | Grams |
| --- | --- |
| Sodium aluminate | 2.4 |
| Sodium hydroxide pellets | 19.3 |
| Sodium silicate | 34.4 |
| Water | 76.5 |

| Solution B: | |
| --- | --- |
| Lithium hydroxide monohydrate | 75 |
| Water | 600 |

| Solution C: | |
| --- | --- |
| Sodium aluminate | 28.8 |
| Water | 100 |

| Solution D: | |
| --- | --- |
| Sodium silicate | 411 |
| Water | 155 |

Solution A had the following calculated composition, in terms of mole ratios of oxides:

$$Na_2O/SiO_2\ 1:85:1$$
$$SiO_2/Al_2O_3\ 16:1$$
$$H_2O/Na_2O\ 18:1$$

Solution A, which was clear, was heated at 60° C. for 0.5 hour. Solution B was added to solution D, and then to the resulting mixture solution A was added under vigorous stirring in a 1-gallon Waring Blendor. Finally solution C was added so that the over all mixture had the following composition, in terms of mole ratios of oxides:

$$Li_2O/Li_2O+Na_2O\ 6/10+6.7\ or\ 0.36:1$$
$$Li_2O+Na_2O/SiO_2\ 10+6.7/16.3\ or\ 1.02:1$$
$$SiO_2/Al_2O_3\ 16.3:1$$
$$H_2O/Li_2O+Na_2O\ 450/10+6.7\ or\ 27:1$$

Addition of solution C resulted in formation of a gel, and the over all mixture was then heated at 60° C. for 5 days, filtered, and the filter cake washed to a filtrate pH of 10.5. The crystalline product, comprising particles of 2 to 3 microns diameter, was dried at 110° C. In a series of three sorption tests the product adsorbed 17.7%, 18.8%, and 17.8% by weight of cyclohexane, respectively, and in another series it adsorbed 28.4%, 31.3%, and 30.0% by weight of water, respectively. Ignoring water of hydration, chemical analysis, in terms of mole ratios of oxides, showed the product to have the formula:

$$0.43Na_2O:0.62Li_2O:Al_2O_3:3.1SiO_2 \qquad (VI)$$

It exhibited the X-ray powder diffraction pattern of Table 1.

Example 2

Zeolite ZSM-3 was also synthesized as follows: Four solutions were again prepared, identified as A, B, C, and D:

Solution A, or CDA solution: Grams
Sodium aluminate _____ 19.2
Sodium hydroxide pellets _____ 154.4
Sodium silicate _____ 275.2
Water _____ 612

Solution B:
Sodium silicate _____ 1100
Water _____ 800

Solution C:
Aluminum chloride _____ 85.6
Water _____ 1600

Solution D:
Lithium hydroxide monohydrate _____ 48
Water _____ 350

Solution A had the same composition, in terms of mole ratios of oxides, as solution A in the preceding example. Solution A was added to solution B in the Waring Blendor, and then solution C was added rapidly, with stirring continued for about 1 minute. The resulting slurry was heated at 100° C. for 0.5 to 1 hour, filtered, the filter cake heated at 100° C. for 3 hours, and filtered again. The new filter cake was then washed with 2000 ml. of water. Solution D was mixed with the cake as intimately as possible, and the mixture heated at 60° C. for 16 hours and then at 100° C. for 1 hour. The resulting crystalline slurry was filtered and washed until the washings had a pH of less than 11. In a series of three sorption tests the product adsorbed 15.2%, 16.6%, and 16.6%, respectively, by weight of cyclohexane, and in another series it absorbed 23.6%, 25.4%, and 26.0% by weight of water, respectively. Chemical analysis, in terms of mole ratios of oxides, showed the product to be included by the formula:

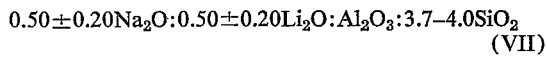
$$0.50 \pm 0.20 Na_2O : 0.50 \pm 0.20 Li_2O : Al_2O_3 : 3.7-4.0 SiO_2 \quad (VII)$$

again ignoring water of hydration. It exhibited the X-ray diffraction pattern of Table 1.

Example 3

Several additional species of ZSM-3 were prepared and are identified in the table below in their dehydrated state. Of these, approximately half were prepared substantially in accordance with the method of Example 1, and the rest in accordance with the method of Example 2.

TABLE 5.—SORPTION AND QUANTITATIVE ANALYSIS OF ZSM-3

| No. | Sorption, Wt.% | | Quantitative Analysis | | | |
|---|---|---|---|---|---|---|
| | Water | Cyclohexane | $Na_2O$ | $Li_2O$ | $Al_2O_3$ | $SiO_2$ |
| CSF-163 | 25.6 | 16.7 | .485 | .324 | 1 | 3.67 |
| CSF-166 | 23.6 | 15.2 | .598 | .385 | 1 | 3.65 |
| CSF-167 | 25.4 | 16.6 | .682 | .360 | 1 | 3.75 |
| CSF-168 | 26.0 | 16.6 | .630 | .355 | 1 | 3.59 |
| 272-B | 29.9 | 19.4 | .77 | .09 | 1 | 3.20 |
| 259-B | 29.9 | 20.0 | .80 | .22 | 1 | 2.95 |
| 270-C | 27.4 | 18.9 | .755 | .270 | 1 | 3.57 |

Example 4

Use of ZSM-3 as a cracking catalyst is demonstrated as follows. Zeolite ZSM-3 having the following oxide formula:

$$0.64 Na_2O : 0.37 Li_2O : Al_2O_3 : 3.66 SiO_2 : zH_2O \quad (VIII)$$

where z has a value of 0 to 9, was ion exchanged by lanthanum to replace part of the sodium and lithium. The ion exchange was carried out by subjecting the zeolite to three treatments with an aqueous solution containing about 5% by weight of lanthanum chloride, followed by washing and drying. Chemical analysis of the resulting aluminosilicate showed it to contain 23.2% lanthanum oxide, 0.11% lithium oxide, and 0.52% sodium, weight basis. It was then intimately mixed with a matrix comprising McNamee clay in such amounts as to give a resulting mass comprising 15% of the aluminosilicate and 85% clay, weight basis. The sodium content of the mass was 0.10% by weight. The mass was heated for 10 hours in air at 1000° F. and then steamed for 24 hours in an atmosphere of 100% steam at 1200° F. and 15 p.s.i.g.

The steamed catalyst mass was then used (Cat D test) to catalyze the cracking of a Midcontinent gas oil having a boiling point range of 450–950° F. and a specific gravity of 0.88 g./cc. The gas oil was vaporized and preheated to 875° F., and then pumped at a rate of 5 cc./min. through a 100 cc. bed of the catalyst mass maintained at 875° F. by external heat. The duration of the run was 10 minutes, the liquid hourly space velocity was 3, and the catalyst-to-oil ratio was 2. Reactor effluents were condensed and separated into $C_4$-free gasoline, dry gas comprising $C_1$-$C_3$ material, a $C_4$ fraction, and uncracked oil.

The following data were observed:

Conversion _____ percent volume __ 46.0
$C_4$-free gasoline _____ do ____ 42.7
Total $C_4$'s _____ do ____ 6.9
Dry gas _____ percent weight __ 2.4
Coke _____ do ____ 1.4
$H_2$ _____ do ____ 0.06

Example 5

This example illustrates another catalytic cracking operation. Zeolite ZSM-3, corresponding to species No. CSF-163 of Table 5, was subjected to ion exchange by lanthanum, using the procedure described in the preceding example. The resulting aluminosilicate contained, besides lanthanum, about 0.19% lithium oxide and 2.51% sodium, weight basis. It was mixed with McNamee clay to give a mass containing 15% of the aluminosilicate and 85% of clay, with the sodium content being reduced to 0.35% by weight. The mass was heated for 18 hours in air at 1000° F. and then for 24 hours in an atmosphere of 100% steam at 1200° F. and 15 p.s.i.g.

The mass was used to catalyze the catalytic cracking of another sample of Midcontinent gas oil, as in the preceding example, using the same conditions.

The following data were obtained:

Conversion _____ percent volume __ 69.1
$C_4$-free gasoline _____ do ____ 58.0
Total $C_4$'s _____ do ____ 13.8
Dry gas _____ percent weight __ 5.7
Coke _____ do ____ 2.3
$H_2$ _____ do ____ 0.08

The periodic table classifications as used herein are based on the arrangement distributed by E. H. Sargent & Co. and further identified by the legend "Copyright 1962 Dyna-Slide Co."

It will be understood that the invention is capable of obvious variations without departing from its scope.

In the light of the foregoing description, the following is claimed:

1. A synthetic crystalline lithium-sodium aluminosilicate having a composition, in terms of mole ratios of oxides, as follows:

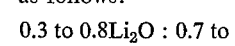
$$0.3 \text{ to } 0.8 Li_2O : 0.7 \text{ to } 0.2 Na_2O : Al_2O_3 : 2.8 \text{ to } 4.5 SiO_2 : 0-9 H_2O$$

said aluminosilicate having an X-ray powder diffraction pattern essentially the same as that shown in Table 1 of the specification.

2. A synthetic crystalline lithium-sodium aluminosilicate having a composition, in terms of mole ratios of oxides, as follows:

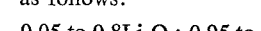
$$0.05 \text{ to } 0.8 Li_2O : 0.95 \text{ to } 0.2 Na_2O : Al_2O_3 : 2.8 \text{ to } 4.5 SiO_2 : 0-9 H_2O$$

said aluminosilicate having an X-ray powder diffraction pattern essentially the same as that shown in Table 1 of the specification.

3. A crystalline synthetic lithium-sodium aluminosilicate having silicon and aluminum present in such proportion that the ratio of silica to alumina is 2.8:1 to 6:1, said aluminosilicate having an X-ray powder diffraction pattern essentially the same as that shown in Table 1, at least a portion of the sodium and lithium being replaced by at least one cation from the group comprising metals of Groups I and II of the Periodic Table, rare earth metals, transition metals, and ammonium.

4. Method of preparing a lithium-sodium crystalline aluminosilicate defined by the formula set forth in claim 2 which comprises preparing a mixture containing lithium oxide, sodium oxide, alumina, silica, and water and having a composition, in terms of mole ratios of oxides, falling within the following ranges:

$Li_2O/Li_2O+Na_2O$ ---------------- 0.2:1–0.9:1
$Li_2O+Na_2O/SiO_2$ ---------------- 0.55:1–2.5:1
$SiO_2/Al_2O_3$ -------------------- 2:1–32:1
$H_2O/Li_2O+Na_2O$ ---------------- 20:1–300:1 maintaining the mixture at a temperature of 20 to 120° C. until crystals of said aluminosilicate are formed, and separating said crystals.

5. Method of claim 4 wherein said composition has the following ranges:

$Li_2O/Li_2O+Na_2O$ ---------------- 0.25:1–0.82:1
$Li_2O+Na_2O/SiO_2$ ---------------- 0.61:1–1.33:1
$SiO_2/Al_2O_3$ -------------------- 4:1–16:1
$H_2O/Li_2O+Na_2O$ ---------------- 40:1–120:1

6. Method for synthesizing a crystalline aluminosilicate zeolite which comprises preparing a reaction mixture whose composition expressed in terms of oxide mole ratios falls within the following ranges:

$Li_2O/Li_2O+Na_2O$ ---------------- 0.1:1–0.9:1
$Li_2O+Na_2O/SiO_2$ ---------------- 0.25:1–3:1
$SiO_2/Al_2O_3$ -------------------- 2:1–32:1
$H_2O/Li_2O+Na_2O$ ---------------- 20:1–300:1 maintaining said mixture at a temperature within the approximate range of 20 to 120° C. until crystals of said zeolite are formed, and separating and recovering the crystals.

7. Method of preparing a lithium-sodium crystalline aluminosilicate defined by the formula set forth in claim 2 which comprises forming a crystallization directing agent containing sodium oxide, alumina, silica, and water and having a composition, in terms of mole ratios of oxides, within the following ranges:

$Na_2O/SiO_2$ ---------------------- 1.5:1–2.2:1
$SiO_2/Al_2O_3$ -------------------- 12:1–22:1
$H_2O/Na_2O$ ---------------------- 15:1–25:1 then mixing a solution containing lithium oxide and water with a solution containing sodium oxide, silica, and water, adding to the resulting mixture said agent, and then adding thereto a solution containing sodium oxide, alumina, and water to form a reaction mixture having a composition, in terms of mole ratios of oxides, falling within the following ranges:

$Li_2O/Li_2O+Na_2O$ ---------------- 0.2:1–0.9:1
$Li_2O+Na_2O/SiO_2$ ---------------- 0.55:1–2.5:1
$SiO_2/Al_2O_3$ -------------------- 2:1–32:1
$H_2O/Li_2O+Na_2O$ ---------------- 20:1–300:1 maintaining the mixture at a temperature of 20 to 120° C. until crystals of said aluminosilicate are formed, and separating said crystals.

8. Method of preparing a lithium-sodium crystalline aluminosilicate defined by the formula set forth in claim 2 which comprises forming a crystallization directing agent containing sodium oxide, alumina, silica, and water and having a composition, in terms of mole ratios of oxides, within the following ranges:

$Na_2O/SiO_2$ ---------------------- 1.5:1–2.2:1
$SiO_2/Al_2O_3$ -------------------- 12:1–22:1
$H_2O/Na_2O$ ---------------------- 15:1–25:1 mixing said agent with a solution containing sodium oxide, silica, and water, adding to the resulting mixture a solution containing alumina and water to form a slurry and filtering the same, mixing the filter cake with a solution containing lithium oxide and water to form a reaction mixture having a composition, in terms of mole ratios of oxides, falling within the following ranges:

$Li_2O/Li_2O+Na_2O$ ---------------- 0.1:1–0.8:1
$Li_2O+Na_2O/SiO_2$ ---------------- 0.25:1–3:1
$SiO_2/Al_2O_3$ -------------------- 2:1–10:1
$H_2O/Li_2O+Na_2O$ ---------------- 20:1–300:1 miantaining the mixture at a temperature of 20 to 120° C. until crystals of said aluminosilicate are formed, and separating said crystals.

9. Method of preparing a lithium-sodium crystalline aluminosilicate defined by the formula set forth in claim 2 which comprises mixing a first solution containing sodium oxide, silica, and water with a crystallization directing agent containing sodium oxide, alumina, silica, and water and having a composition, in terms of mole ratios of oxides, within the following ranges:

$Na_2O/SiO_2$ ---------------------- 1.5:1–2.2:1
$SiO_2/Al_2O_3$ -------------------- 12:1–22:1
$H_2O/Na_2O$ ---------------------- 15:1–25:1 adding to the resulting mixture a second solution comprising an acidic solution containing alumina and water, thereby forming a mixture having suspended therein a gelatinous precipitate, filtering the same, dividing the filter cake into two parts, mixing one of said parts with a solution containing lithium and water to introduce lithium therein, then mixing said one part with the other in the presence of additional solution containing lithium and water to form a reaction mixture having a composition, in terms of mole ratios of oxides, falling within the following ranges:

$Li_2O/Li_2O+Na_2O$ ---------------- 0.1:1–0.8:1
$Li_2O+Na_2O/SiO_2$ ---------------- 0.25:1–3:1
$SiO_2/Al_2O_3$ -------------------- 2:1–10:1
$H_2O/Li_2O+Na_2O$ ---------------- 20:1–300:1 and maintaining the last mentioned mixture at 20 to 120° C. until said crystalline aluminosilicate is formed.

10. Method of preparing a lithium-sodium crystalline aluminosilicate defined by the formula set forth in claim 2 which comprises preparing a mixture containing lithium oxide, sodium oxide, alumina, silica, and water, the amounts of lithium oxide, sodium oxide, and silica varying as defined by the area ABCDEA of the accompanying mole percent composition diagram, the mole ratio of silica to alumina varying from 4:1 to 16:1, thereby defining the amount of alumina in said mixture, and the mole ratio of water to the sum of lithium oxide and sodium oxide varying from 40:1 to 120:1, thereby defining the amount of water in said mixture, maintaining the mixture at a temperature of 20 to 120° C. until crystals of said aluminosilicate are formed, and separating said crystals.

11. A process for converting a hydrocarbon charge which comprises contacting the same under conversion conditions with a catalyst comprising the crystalline aluminosilicate defined in claim 16.

12. A process for cracking a hydrocarbon charge which comprises contacting the same under cracking conditions with a catalyst comprising the crystalline aluminosilicate defined in claim 3.

13. A process for hydrocracking a hydrocarbon charge which comprises contacting the same in the presence of hydrogen under hydrocracking conditions with a catalyst comprising the crystalline aluminosilicate defined in claim 3.

14. A crystalline synthetic lithium-sodium aluminosilicate having silicon and aluminum present in such proportion that the ratio of silica to alumina is 2.0:1 to 6:1, said aluminosilicate having an X-ray powder diffraction pattern esentially the same as that shown in Table 1.

15. A process for converting a hydrocarbon charge which comprises contacting the same under conversion conditions with a catalyst comprising the crystalline aluminosilicate defined in claim 14.

16. A crystalline synthetic lithium-sodium aluminosilicate having silicon and aluminum present in such proportion that the ratio of silica to alumina is 2.8:1 to 6:1, said aluminosilicate having an Xray powder diffraction pattern essentially the same as that shown in Table 1, at least a portion of the sodium and lithium being replaced by at least one cation from the group comprising metals of Groups I and II of the Periodic Table, rare earth metals, metals of the actinide series, transition metals, and ammonium, alkylammonium, and arylammonium cations.

References Cited

UNITED STATES PATENTS

| | | | |
|---|---|---|---|
| 3,123,441 | 3/1964 | Haden et al. | 23—113 |
| 3,236,761 | 2/1966 | Rabo et al. | 208—120 X |

DANIEL E. WYMAN, *Primary Examiner.*

C. F. DEES, *Assistant Examiner.*

U.S. Cl. X.R.

252—455; 23—112; 208—120